(12) United States Patent
Philbrick et al.

(10) Patent No.: US 11,704,726 B1
(45) Date of Patent: Jul. 18, 2023

(54) SYSTEMS AND METHODS FOR BARTERING SERVICES AND GOODS USING DISTRIBUTED LEDGER TECHNIQUES

(71) Applicant: United Services Automobile Association (USAA), San Antonio, TX (US)

(72) Inventors: Ashley Raine Philbrick, San Antonio, TX (US); Oscar Guerra, San Antonio, TX (US); Kelly Q. Baker, San Antonio, TX (US); Carlos J P Chavez, San Antonio, TX (US); Yevgeniy Viatcheslavovich Khmelev, San Antonio, TX (US); Theresa Marie Matowitz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 5 days.

(21) Appl. No.: 17/103,056

(22) Filed: Nov. 24, 2020

Related U.S. Application Data

(60) Provisional application No. 62/940,645, filed on Nov. 26, 2019.

(51) Int. Cl.
```
G06Q 30/02    (2023.01)
G06Q 30/08    (2012.01)
H04L 9/06     (2006.01)
G06Q 50/18    (2012.01)
H04L 9/00     (2022.01)
```

(52) U.S. Cl.
CPC ........... *G06Q 30/08* (2013.01); *G06Q 50/188* (2013.01); *H04L 9/0643* (2013.01); *H04L 9/50* (2022.05)

(58) Field of Classification Search
CPC .... G06Q 30/08; G06Q 50/188; H04L 9/0643; H04L 2209/38; H04L 9/50
See application file for complete search history.

(56) References Cited

U.S. PATENT DOCUMENTS

| | | | | |
|---|---|---|---|---|
| 2006/0064409 | A1* | 3/2006 | Hardwick | G06Q 30/06 |
| 2007/0124228 | A1* | 5/2007 | Elias | G06Q 40/04 |
| | | | | 705/37 |

(Continued)

OTHER PUBLICATIONS

P. Haddawy, K. Dhananaiyapergse, Y. Kaewpitakkun and T. Bui, "Data-driven agent-based simulation of commercial barter trade," Proceedings. IEEE/WIC/ACM International Conference on Intelligent Agent Technology, 2004. (IAT 2004)., 2004, pp. 218-224, doi: 10.1109/IAT.2004.1342947. (Year: 2004).*

(Continued)

*Primary Examiner* — Sun M Li
(74) *Attorney, Agent, or Firm* — Fletcher Yoder P.C.

(57) ABSTRACT

Systems and methods described herein track bartering using distributed ledger techniques to, for example, facilitate the establishment of a bartering marketplace that enables users to barter for, and ultimately exchange, services and/or goods with each other. In certain embodiments, a monetary value may be assigned to each service and/or good to be bartered to establish appropriate bartering baselines. In addition, in certain embodiments, additional monetary value exchanges may be tracked for particular exchanges to make sure that the exchanges are fair.

21 Claims, 5 Drawing Sheets

(56) References Cited

U.S. PATENT DOCUMENTS

| | | | |
|---|---|---|---|
| 2013/0246255 A1* | 9/2013 | Pernice | G06Q 30/00 |
| | | | 705/39 |
| 2016/0330034 A1* | 11/2016 | Back | G06Q 20/065 |
| 2017/0206523 A1* | 7/2017 | Goeringer | G06F 21/45 |
| 2018/0232828 A1* | 8/2018 | Joao | H04L 9/3239 |
| 2018/0285996 A1* | 10/2018 | Ma | G06F 16/2428 |
| 2019/0102850 A1* | 4/2019 | Wheeler | G06Q 20/405 |
| 2019/0172121 A1* | 6/2019 | Fleming | G06Q 30/0633 |
| 2019/0236594 A1* | 8/2019 | Ehrlich-Quinn | H04L 9/3263 |

OTHER PUBLICATIONS

J. Huo and H. Qu, "Design and implementation of a second-hand items trading platform based on Android," 2016 5th International Conference on Computer Science and Network Technology (ICCSNT), 2016, pp. 21-34, doi: 10.1109/ICCSNT.2016.8069371. (Year: 2016).*
C. Damian, A. Panu, M. Robu and E. Luncă, "Storing Custom Data Sets in a Blockchain System," 2019 International Conference on Electromechanical and Energy Systems (SIELMEN), Craiova, Romania, 2019, pp. 1-6, doi: 10.1109/SIELMEN.2019.8905810. (Year: 2019).*
G. D'mello and H. González-Vélez, "Distributed Software Dependency Management Using Blockchain," 2019 27th Euromicro International Conference on Parallel, Distributed and Network-Based Processing (PDP), Pavia, Italy, 2019, pp. 132-139, doi: 10.1109/EMPDP.2019.8671614. (Year: 2019).*

* cited by examiner

SYSTEMS AND METHODS FOR BARTERING SERVICES AND GOODS USING DISTRIBUTED LEDGER TECHNIQUES

CROSS-REFERENCE TO RELATED APPLICATION

The present disclosure is related to, and claims priority to, U.S. Provisional Patent Application Ser. No. 62/940,645, titled "Systems and Methods for Bartering Services and Goods using Distributed Ledger Techniques," which was filed on Nov. 26, 2019, and which is herein incorporated by reference in its entirety for all purposes.

BACKGROUND

The present disclosure relates generally to systems and methods for facilitating bartering for services and goods and, more particularly, to systems and methods for enabling a marketplace for bartering for services and goods using distributed ledger techniques.

Quite often, individuals may desire to exchange services and/or goods with other individuals. However, these individuals often do not have a common marketplace that facilitates bartering for such services and/or goods. Furthermore, even in situations where bartering between individuals is encouraged, there is no centralized repository for tracking such bartering or the exchanges that actually occur as part on these bartering processes.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include distributed ledger systems such as blockchain systems, application programming interfaces (APIs), and/or methods for operation thereof that may implement a distributed ledger infrastructure for enabling a marketplace for bartering for services and goods using distributed ledger techniques.

In a first embodiment, a system includes at least one processor and at least one non-transitory computer-readable storage media communicatively coupled to the at least one processor. The at least one non-transitory computer-readable storage media stores instructions which, when executed by the at least one processor, cause the at least one processor to perform operations including receiving data relating to a bartering offer of a first set of one or more services or goods in exchange for a second set of one or more services or goods from a first user device associated with a first user, and storing the data relating to the bartering offer in a distributed ledger network. The operations also include receiving data relating to a bartering counteroffer to the bartering offer from a second user device associated with a second user, and storing the data relating to the bartering counteroffer in the distributed ledger network. The bartering counteroffer includes at least one change to the first set of one or more services or goods or the second set of one or more services or goods. The operations further include receiving confirmation of completion of an exchange of the first set of one or more services or goods for the second set of one or more services or goods, and storing data relating to the completion of the exchange in the distributed ledger network.

In a second embodiment, a method performed by at least one processor includes receiving data relating to a bartering offer of a first set of one or more services or goods in exchange for a second set of one or more services or goods from a first user device associated with a first user, and storing the data relating to the bartering offer in a distributed ledger network. The method also includes receiving data relating to a bartering counteroffer to the bartering offer from a second user device associated with a second user, and storing the data relating to the bartering counteroffer in the distributed ledger network. The bartering counteroffer includes at least one change to the first set of one or more services or goods or the second set of one or more services or goods. The method further includes receiving confirmation of completion of an exchange of the first set of one or more services or goods for the second set of one or more services or goods, and storing data relating to the completion of the exchange in the distributed ledger network.

In a third embodiment, one or more non-transitory computer-readable storage media store instructions which, when executed by at least one processor, cause the at least one processor to perform operations including receiving data relating to a bartering offer of a first set of one or more services or goods in exchange for a second set of one or more services or goods from a first user device associated with a first user, and storing the data relating to the bartering offer in a distributed ledger network. The operations also include receiving data relating to a bartering counteroffer to the bartering offer from a second user device associated with a second user, and storing the data relating to the bartering counteroffer in the distributed ledger network. The bartering counteroffer includes at least one change to the first set of one or more services or goods or the second set of one or more services or goods. The operations further include receiving confirmation of completion of an exchange of the first set of one or more services or goods for the second set of one or more services or goods, and storing data relating to the completion of the exchange in the distributed ledger network.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
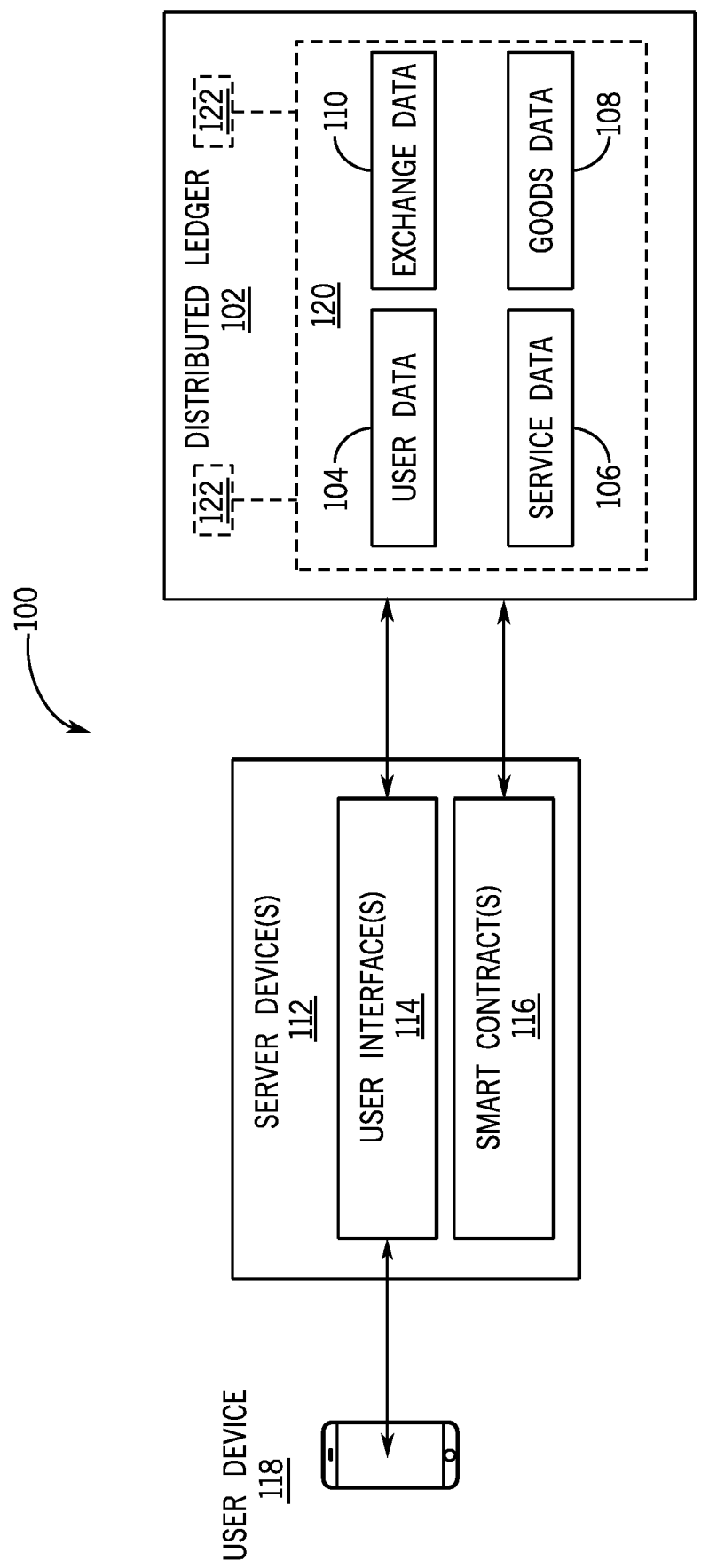
FIG. 1 illustrates a system for tracking bartering relating to services and goods, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and methods for tracking bartering using distributed ledger techniques to, for example, facilitate the establishment of a bartering marketplace that enables users to barter for, and ultimately exchange, services and/or goods with each other. In certain embodiments, a monetary value (e.g., which may be entirely made up (i.e., fictitious) for the purposes of the bartering marketplace, in certain embodiments) may be assigned to each service and/or good to be bartered. However, this monetary value may simply be for the purpose of valuing the service and/or good for the purpose of establishing appropriate bartering baselines. In addition, in certain embodiments, additional monetary value exchanges may be tracked for particular exchanges to make sure that the exchanges are fair. In general, the bartering marketplace described herein would obviate the need for (or, at least, reduce) sales taxes. In addition, in certain embodiments, one or more matching algorithms may be used to identify individuals with particular needs and supplies (e.g., a restaurant and a farm, as but one non-limiting example) for bartering purposes.

As used herein, the term "service" is intended to mean any and all tasks that may be performed by a first user for a second user. Example services may include, but are not limited to, household maintenance (e.g., house cleaning, pool cleaning, carpet cleaning, lawn mowing, hedge trimming, gutter cleaning, car washing, plumbing services, electrical services, electronic device set-up, and so forth), personal care (e.g., babysitting, elderly care, and so forth), financial services (e.g., financial planning, tax planning, tax return preparation, budget preparation, foreign monetary exchange, and so forth), consulting services (e.g., mentoring, career counseling, drug/alcohol addition support/sponsoring, and so forth), delivery services (e.g., vehicle for hire, food delivery, medicine delivery, package delivery, and so forth), among other services. In addition, a used herein, the term "good" is intended to mean any and all personal property, new or used, which may be exchanged between first and second users.

FIG. 1 illustrates a system 100 for tracking bartering relating to services and goods, in accordance with embodiments described herein. As shown in the example of FIG. 1, the system 100 may include a distributed ledger 102 that may include one or more blockchains. The distributed ledger 102 may be hosted on any suitable number of computing devices that operate as nodes for the distributed ledger 102. Such nodes may be geographically distributed in any suitable number of locations.

Figure 2:
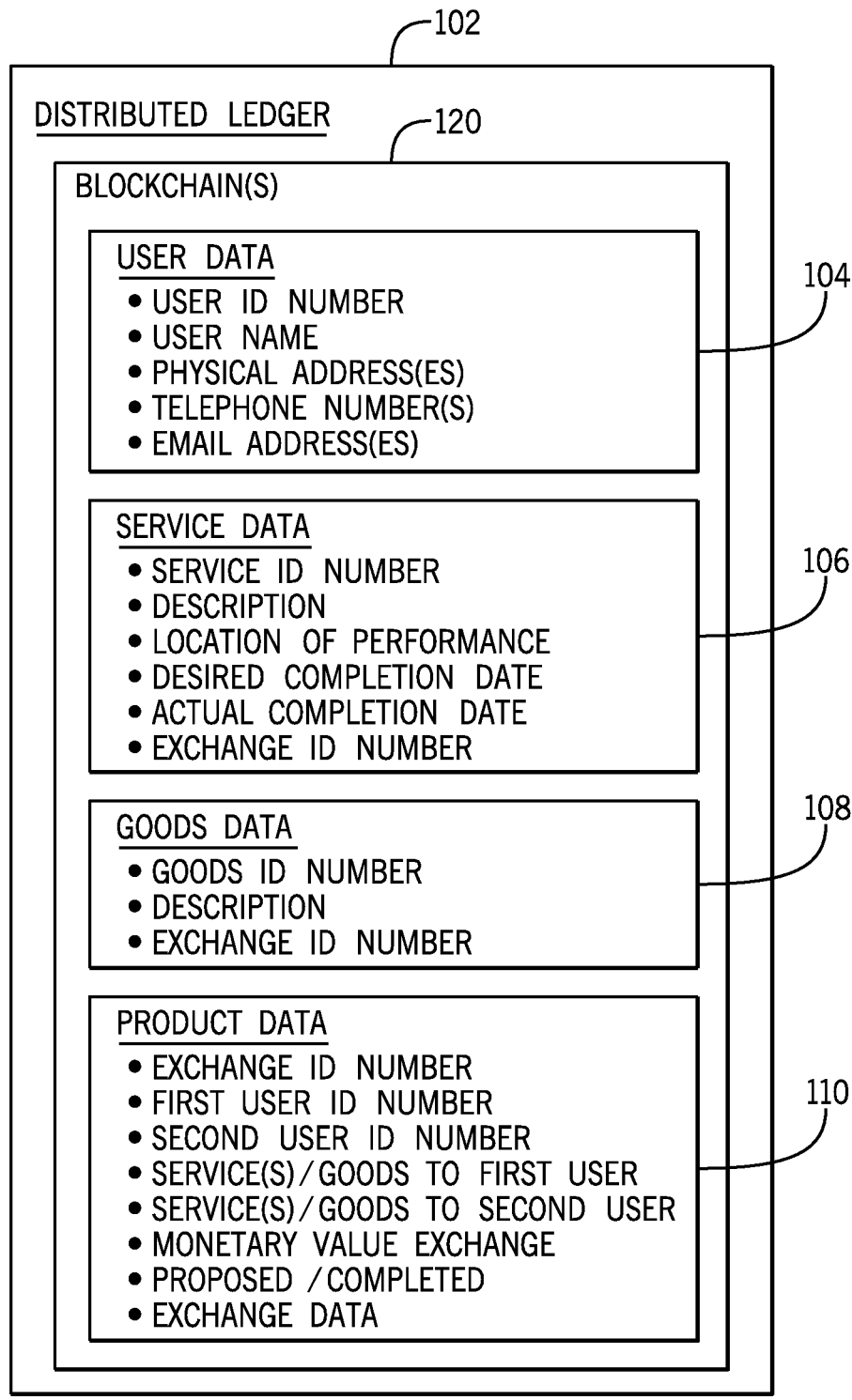
FIG. 2 illustrates certain types of data that may be stored in the distributed ledger (e.g., blockchain network) of FIG. 1, in accordance with embodiments described herein.

The distributed ledger 102 may store any appropriate number of data records of various types, including user data 104, service data 106, goods data 108, and exchange data 110, among other types of data. As illustrated in FIG. 2 and described in greater detail herein, in certain embodiments, the user data 104 may include a user identification (ID) number (e.g., social security number, driver's license number, customer ID number, employee ID number, student ID number, and so forth) of the user, a name of the user, one or more physical address(es) of the user, one or more telephone number(s) for the user, and one or more email address(es) for the user, among other data. In addition, in certain embodiments, the service data 106 may include a service ID number, a description of the service, a location for performance of the service, a desired completion date for the service, an actual completion date for the service, and an exchange ID number relating to a particular exchange of which the service was a part, among other data. In addition, in certain embodiments, the goods data 108 may include a product ID number, a description of the product, and an exchange ID number relating to a particular exchange of which the product was a part, among other data. In addition, in certain embodiments, the exchange data 110 may include an exchange ID number for an exchange, a first user ID number for a first party of the exchange, a second user ID number for a second party of the exchange, one or more service(s) and/or product(s) (e.g., as identified by their respective service ID number(s) and/or product ID number(s)) being exchanged to the first party as part of the exchange, one or more service(s) and/or product(s) (e.g., as identified by their respective service ID number(s) and/or product ID number(s)) being exchanged to the second party as part of the exchange, a monetary value that is exchanged to/from the first party to the second party as part of the exchange, whether the exchange is merely proposed (e.g., as part of the bartering process) or has actually been completed, and the exchange date if the exchange has actually been completed, among other data. It will be appreciated that the types of data described herein are merely exemplary, and not intended to be limiting. Furthermore, it will also be appreciated that each of these types of data may be related to each other in a one-to-one or one-to-many manner, as appropriate, depending on the particular type of relationship between the data types.

Returning now to FIG. 1, one or more server devices 112 may have access to the distributed ledger 102. In certain embodiments, the server device(s) 112 may be nodes that host at least a portion of the distributed ledger 102. Alternatively, the distributed ledger 102 may be hosted on computing device(s) other than the server device(s) 112. The server device(s) 112 may include any suitable number and type of computing devices. In certain embodiments, the server device(s) 112 may execute one or more smart contracts 116 that facilitate tracking of bartering relating to services and goods, as described in greater detail herein. In certain embodiments, the server device(s) 112 may provide one or more user interfaces 114. In certain embodiments, these user interfaces 114 may be provided through a same portal, with different interfaces accessible to different types of entities with different access permissions. In certain embodiments, the user interfaces 114 may be web interfaces provided through a web site hosted by the server device(s) 112, and the user interfaces 114 may be presented on user devices 118 through web browsers executing on those user devices 118. In certain embodiments, the user interface(s) 114 may provide content to be presented through an application (e.g., app, mobile app) executing on the user devices 118. The user device(s) 118 may include any suitable type of computing devices, including portable computing devices (e.g., smartphone, tablet computer, wearable computer, etc.).

In certain embodiments, the server device(s) 112 may be configured to facilitate interaction with the data (e.g., the user data 104, the service data 106, the goods data 108, the exchange data 110, and so forth) stored in the distributed ledger 102 via the user interfaces 114 for the purpose of tracking bartering relating to services and goods, among other things. For example, a first user may enter information relating to services and/or goods the first user wishes to barter with and/or barter for using a user interface 114 displayed via a first user device 118 associated with the first user, and this information relating to the services and/or goods may be stored as service data 106 and/or goods data 108 in the distributed ledger 102. Subsequently, a second user may view the information relating to the services and/or goods that are offered and/or desired by the first user using a user interface 114 displayed via a second user device 118 associated with the second user, and may propose an exchange of services and/or goods with the first user as exchange data 110, which may be marked as merely proposed until the bartering process has been completed. In certain situations, the proposed exchange from the second user may include a counter-proposal (e.g., whereby certain terms of the proposed exchange, such as the particular services and/or goods that will be exchanged, an additional monetary value to be exchanged in addition to the services and/or goods, and so forth), which may also be stored as exchange data 110. In response, the first user may either accept the proposed exchange or make a counter-proposal (e.g., whereby certain terms of the proposed exchange, such as the particular services and/or goods that will be exchanged, an additional monetary value to be exchanged in addition to the services and/or goods, and so forth), which may also be stored as exchange data 110. This process may continue until the bartering process is completed or called off by the first user of the second user. As such, the embodiments described herein enable the establishment of a marketplace that facilitates bartering between various users.

Use of a distributed ledger 102 (e.g., blockchain system) provides for the tracking of bartering of services and/or goods that is relatively fast, inexpensive, ubiquitous, secure, and immutable. In addition, in certain embodiments, smart contract(s) 116 may be configured to perform operations to manage the tracking of bartering between users. In addition, in certain embodiments, the distributed ledger 102 may include a main blockchain 120 and one or more sidechains 122 that are linked to the main blockchain 120. For example, in certain embodiments, the sidechains 122 may store information relating to tracked services and/or goods, but be maintained by organizations other than the organization that maintains the main blockchain 120, and provide the information relating to the tracked services and/or goods to the system 100 through the server device(s) 112.

Figure 3:
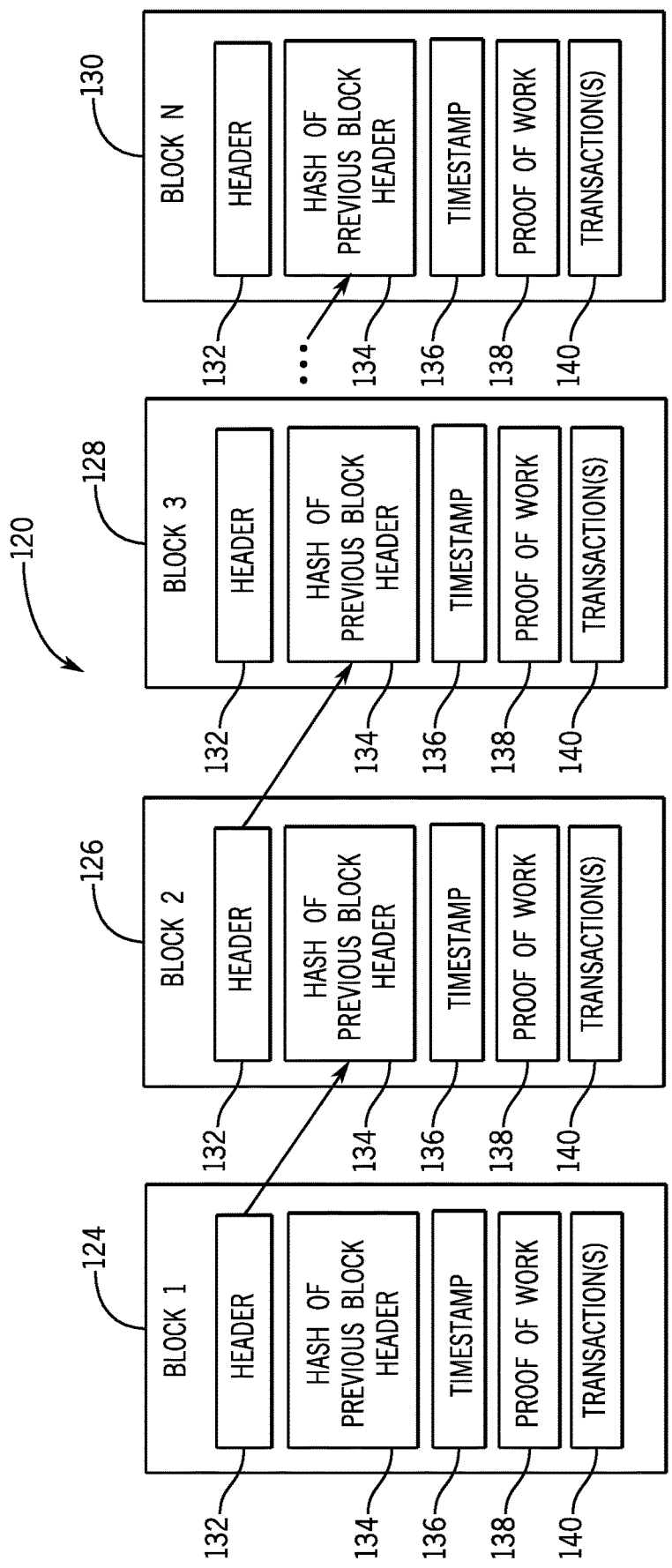
FIG. 3 illustrates a block diagram of a blockchain of the system of FIG. 1, in accordance with embodiments described herein.

FIG. 3 illustrates a block diagram of the blockchain 120 of the system 100 of FIG. 1, in accordance with embodiments described herein. In the illustrated embodiment, the blockchain 120 is illustrated as having multiple blocks 124, 126, 128, and 130. The block 124 (first block in the blockchain 120) may have been created, for example, by the server device(s) 112, and allocated as a special starting block. The block 124 may include a unique header 132 uniquely identifying the block 124 from other blocks in the blockchain 120. Because the block 124 is the first block in the blockchain 120, a hash of a previous block header 134 may be set to zero. A timestamp 136 may include the date of creation for the block 124, and a proof of work section 138 may include certain "work" that proves that a "miner" has performed work suitable for the creation of the block 124 and/or to verify transactions in the blockchain 120. The work section 138 may vary based on a protocol used to create the blockchain 120. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 120, and so on, down the tree. In other words, there is no way to create a fake value that would hash to an expected Merkle tree value (e.g., value stored in work section 138 of the block 124), thus creating a single value that proves the integrity of all of the transactions under it.

Transactions, such as updates relating to the tracking of bartering of services and/or goods, as well as to the actual exchange of services and/or goods as part of the bartering processes, and so forth, may be stored in a transactions section 140. Data related to the particular transaction may also be stored in section 140 (or in another section), including the user data 104, the service data 106, the goods data 108, and the exchange data 110, among other data. In certain embodiments, a new block may be created when a new exchange is to be tracked. For example, new exchange data 110 may result in the creation of a new block. In another embodiment, empty blocks may be first created and then assigned, for example via the server device(s) 112, to new exchange data 110. New user data 104, new service data 106, and new goods data 108 may be similarly handled, in certain embodiments.

When a new block is created, the block will receive a new header 132 uniquely identifying the new block. As described in greater detail herein, a peer-to-peer network may include multiple "miners" (e.g., computing devices 118, 112) that add blocks to the blockchain 120 based on the blockchain protocol. In general, multiple miners validate transactions 140 that are to be added to a block, and compete (e.g., perform computing work, as introduced above) to have their respective block added to the blockchain 120. Validation of transactions includes verifying digital signatures associated with respective transactions 140. For a block to be added to the blockchain 120, a miner must demonstrate a proof of work before their proposed block of transactions is accepted by the peer-to-peer network, and before the block is added to the blockchain 120. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 134) in the blockchain 120, details of the transaction(s) 140 that are to be included in the to-be-created block, and a "nonce" value (e.g., a random number used only once).

Multiple nodes may compete to hash a set of transactions, and to provide the next block that is to be added to the blockchain 120. In certain embodiments, the blockchain protocol may provide a threshold hash to qualify a block to be added to the blockchain 120. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 120. Each miner provides the reference to the previous (most recent) block in the blockchain 120, details of the transaction(s) 140 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 120. Consequently, the respective miner's block is broadcast across the peer-to-peer network (e.g., all user devices 118 communicatively coupled to the system 100). At this point, all other miners cease work (because one miner was already successful), and all copies of the blockchain 120 are updated across the peer-to-peer network to append the block to the blockchain 120. Each miner may produce hundreds of thousands (or more) of hash values, before any one miner provides a qualifying hash value (e.g., at least the first four characters of the hash value are each zero).

It is to be noted that any computing device, such as the user devices 118 and server devices 112, may be miners. Accordingly, for example, as new user data 104, service data 106, goods data 108, and exchange data 110 are created, new blocks may be added to the blockchain 120, including blocks 124, 126, 128, and 130. Indeed, the blockchain 120 may continue to grow, storing new user data 104, service data 106, goods data 108, and exchange data 110. Because of the distributed nature of the peer-to-peer network created via the distributed ledger 102, each node (e.g., computing devices 118, 112) may include copies of the blockchain 120 and share copies of the blockchain 120 as new peers enter the peer-to-peer network. Each copy of the blockchain 120 may include verified information (e.g., data 104, 106, 108, 110) for all or substantially all of the users, services, goods, and exchanges tracked by the distributed ledger 102. The information is secure, immutable, and more efficiently tracked as new data get added via the distributed ledger 102.

Figure 4:
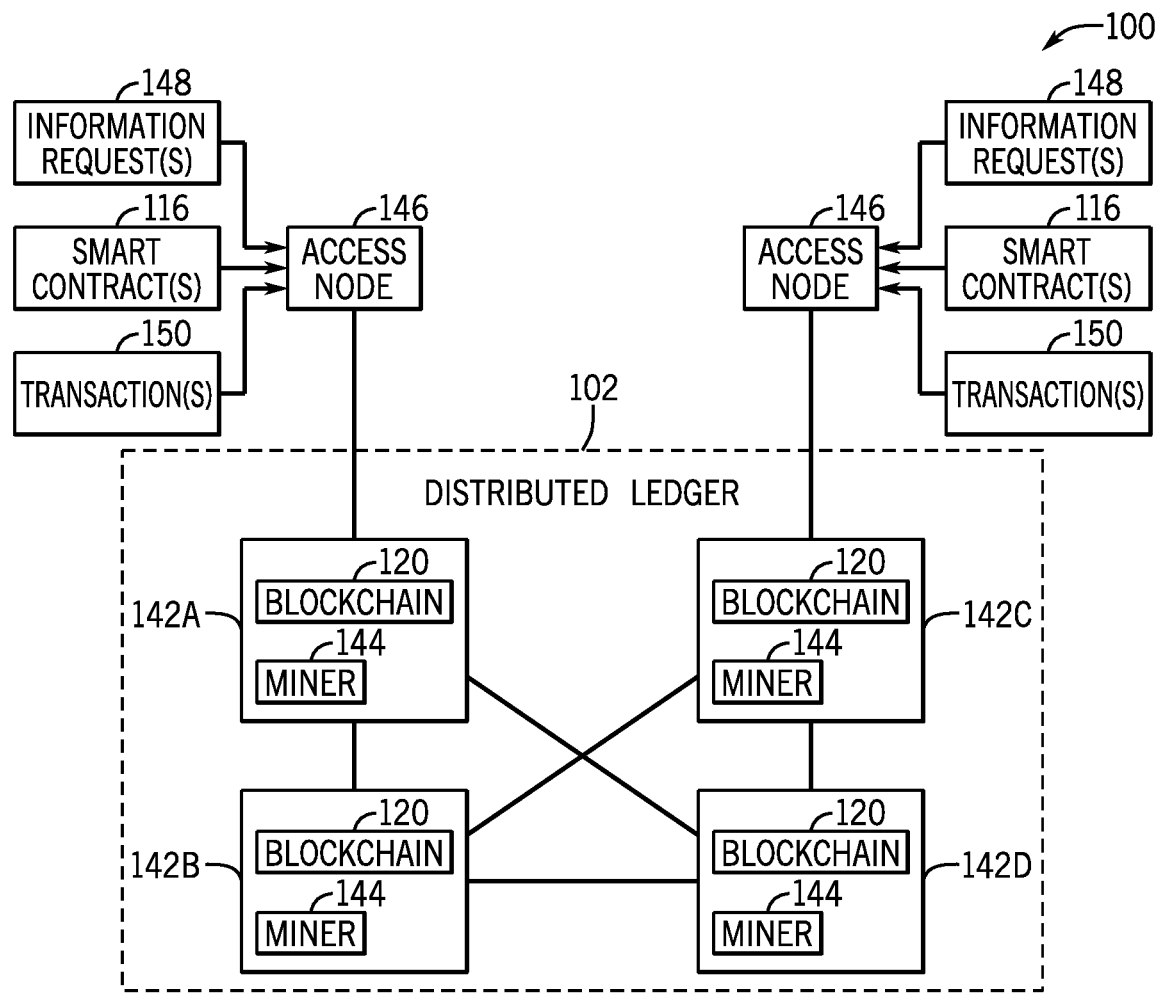
FIG. 4 illustrates a block diagram of the system of FIG. 1, which may be used to track bartering relating to services and goods using the distributed ledger (e.g., blockchain network), in accordance with embodiments described herein.

FIG. 4 illustrates the system 100 of FIG. 1, which may be used to track bartering relating to services and goods using a distributed ledger 102 (e.g., blockchain network), in accordance with embodiments described herein. As described herein, the distributed ledger 102 may be formed by several blockchain nodes, such as blockchain nodes 142A, 142B, 142C, and 142D, which may be implemented by a dedicated server or computer device, or may be implemented as a virtual machine in a shared computer system. Each blockchain node 142A-D may have in its memory a replicate of the blockchain 120. Each blockchain node 142A-D may also have a miner 144, an application that may verify the integrity of the blockchain 120, and may also perform operations and/or transactions using smart contracts 116 associated with the blockchain 120. As described herein, the blockchain 120 is a replicated data structure that may have its consistency and integrity preserved by a consensus mechanism performed by the miners 144.

Users may interact with the distributed ledger 102 via an access node 146. For example, users may request, through the access node 146, the recordation and/or processing of data (e.g., using a smart contract 116), such as an information request 148 (e.g., a request for the state of a smart contract 116), or a transaction request 150 (e.g., a request for a change in a state of the smart contract 116) to the blockchain 120. The smart contracts 116, information requests 148, and/or transaction requests 150 allow users to record information relating to certain users (e.g., the user data 104), information relating to certain services (e.g., the service data 106), information relating to certain goods (e.g., the goods data 108), information relating to certain exchanges (e.g., the exchange data 110), and so forth, to obtain these types of information, to record transactions relating to certain users, services, goods, exchanges, and so forth. Each access node 146 may be implemented by a computer terminal coupled to the distributed ledger 102.

A miner 144 from any of the blockchain nodes 142A, 142B, 142C, and 142D may create an update to the blockchain 120. In certain embodiments, the smart contract(s) 116 may be a data structure that may include states (e.g., internal states) and transaction instructions relating to the data stored in the blockchain 120. The transactions, or functions, may include instructions that modify the states of the smart contracts 116 and/or interact with other smart contracts 116 by performing further transactions. Examples of smart contracts 116 described herein include smart contracts 116 related to storing the user data 104, the service data 106, the goods data 108, the exchange data 110, and so forth, as described herein. Following insertion of a smart contract 116, the blockchain node 142 may propagate its update of the blockchain 120, and the other blockchain nodes 142 may accept the update using a consensus mechanism (e.g., proof of work, proof of stake, and so forth). For example, if blockchain node 142A generated a blockchain segment that incorporates some smart contract 116 to the blockchain 120, blockchain node 142A may propagate the updated blockchain 120 to blockchain nodes 142B, 142C, and 142D, which may validate and accept the updated blockchain 120.

Similarly, a transaction request 150 may be received by any miner 144 of the blockchain nodes 142A, 142B, 142C, and 142D via an access node 146. The transaction request 150 may perform operations that cause a change in the state of a smart contract 116 recorded in the blockchain 120. After performing the desired operations, and changing the state of the smart contract 116, in accordance with the transaction request 150, the miner 144 may update the blockchain 120 to record the updated state of the smart contract 116. The updated state of the smart contract 116 may be propagated to the blockchain nodes 142A-D, verified, and persisted using consensus mechanisms. An information request 148, similar to a transaction request 150, may be received by a miner 144, and may perform operations associated with a smart contract 116. However, in contrast with the transaction request 150, the information request 148 does not lead to changes in the state of the smart contract 116 and, thus, updates to the blockchain 120 that result from a successful information request 148 are not performed.

In certain embodiments, performance of the operations by the miners 144 of the blockchain nodes 142 may be incentivized and/or regulated by exchange of digital tokens. For example, in public blockchains, updates to the blockchain 120 by a blockchain node 142A-D may be rewarded with a digital token. Moreover, performance of a transaction request 150 or an information request 148 may be rewarded with a digital token. For example, in certain embodiments, in the Ethereum public blockchain, updates to the blockchain from recordation of smart contracts 116 and information requests 148 may be rewarded with Ether tokens, and performance of transaction requests 150 and information requests 148 may be incentivized by offers of Ethers in the form of a secondary token called "gas". In certain private blockchain embodiments, tokens may be used to implement prioritization mechanisms for the operations and/or to prevent large or faulty operations from blocking the blockchain 120 with arbitrarily long operation times.

Figure 5:
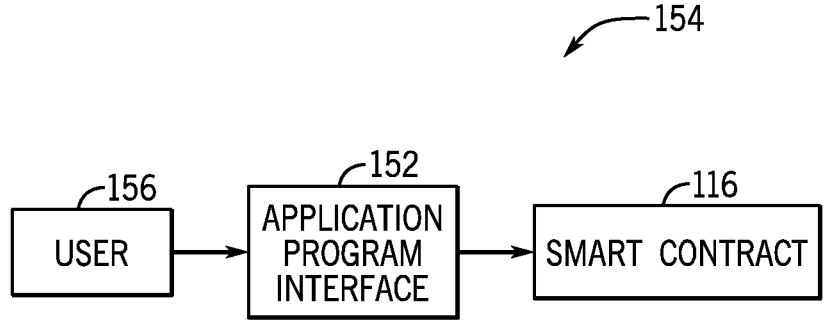
FIG. 5 illustrates an application program interface that may be used to interact with smart contracts, in accordance with embodiments described herein.

The infrastructure described herein may be accessed by an application program interface (API) 152, illustrated in diagram 154 of FIG. 5. In certain embodiments, the API 152 may be accessed from an access node 146. The API 152 may provide users 156 with an interface to the distributed ledger 102. It should be noted that the user 156 may be a human operator accessing a user interface 114 provided by the API 152 or another software performing calls to a computer-accessible interface (e.g., a library) of the API 152. In certain embodiments, the API 152 may be loaded as an interface in an access node 146, or a resource available on the internet that may be accessed using a network application (e.g., a browser) in the access node 146. In certain embodiments, the API 152 may provide tools for creation and interaction with smart contracts 116. For example, the API 152 may convert the state and the functions of a smart contract 116 to binary code for storage and execution by miners 144 of the blockchain 120. In certain embodiments, the API 152 may also convert (e.g., compile) transactions 150 or information requests 148 to a binary message that may be transmitted to the blockchain 120 for execution by miners 144. In certain embodiments, the users 156 may access the smart contracts 116 using the APIs 152, which obey interaction protocols established by the smart contracts 116. Customization of the APIs 152 may allow integration between the system 100 and other internal applications of an organization that wishes to access the system 100.

In certain embodiments, the API 152 may include the option for signing smart contract transactions 150. The signature of the smart contract transaction 150 may include encryption methods using a public/private key infrastructure. For example, a user 156 may have a private key to sign the smart contract transaction 150, which provides proof that the contract was originated by the user 156. Moreover, public/private key infrastructure may also be used to encrypt transactions 150 and prevent unauthorized access. For example, a user 156 may encrypt a transaction parameter using a public key of the smart contract 116 to produce a transaction 150 that can only be readily understood by the smart contract 116. To interact with a smart contract 116, a user 156 may specify a type of smart contract 116, and the API 152 may provide a list of member functions of that particular smart contract 116. The user 156 may, then, choose the member function, and provide inputs or parameters associated with the transaction 150. It should be noted that certain transactions 150 and information requests 148 may require a digital signature for authorization, in certain embodiments. Digital signatures may use the same above-discussed public/private key.

To perform transactions 150, the API 152 may provide an option for the amount of "gas" that a user 156 is willing to use to incentivize performance of the transaction 150, as discussed above. The API 152 may request performance of the transaction 150 to the blockchain 120. The API 152 may receive from the blockchain 120 the results of the transaction 150, which may include an output of the transaction 150, an acknowledgment of execution and/or an indication of failure, when the transaction 150 causes an error, or if the amount of "gas" was insufficient to finalize the operation. It should be understood that the API 152 may provide an interactive user interface 114 that may be accessed by a human user or an executable library that may be accessed by a computer system. The executable library facilitates access to the system 100 by other applications in the user computation environment.

Figure 6:
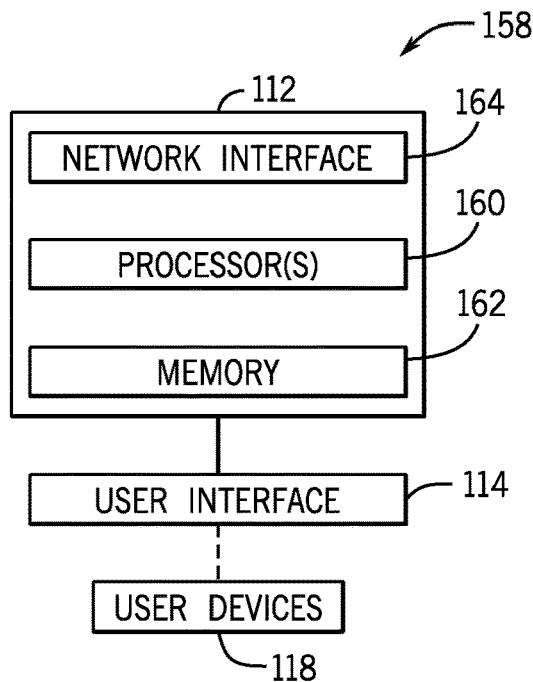
FIG. 6 illustrates a computing system, in accordance with embodiments described herein.

FIG. 6 illustrates a computer system 158 that may be used to implement electronic devices such as the blockchain nodes 142A, 142B, 142C, and 142D and the access nodes 146, in accordance with embodiments described herein. The computer system 158 may include one or more server devices 112, which each may include one or more processors 160 and one or more memories 162. In certain embodiments, the one or more processors 160 may refer to a single application specific integrated circuit (ASIC), to multiple ASICs, or to soft processing circuitry implemented in programmable logic devices, such as FPGAs and PLDs. In certain embodiments, the one or more processors 160 may implement universal processing architectures, such as a complex instruction set computer (CISC) architecture or a reduced instruction set computer (RISC) architecture. In certain embodiments, the one or more processors 160 may implement specialized processing architectures that may include instructions that include, but are not limited to, operations for blockchain mining.

In certain embodiments, the one or more memories 162 may include volatile memory for performance of operations (e.g., random access memory (RAM)) and persistent memory for long-term storage (e.g., hard disks, solid-state devices). Long-term storage may be optimized for durability and/or access speed times by resorting to configurations such as a redundant array of independent disks (RAID) device. In certain embodiments, a network interface 164 may include Ethernet-based connections, including copper wire network connections, backplane connections, and/or wireless (e.g., WiFi) network connections. The network interface 164 may also be implemented using other communication standards including, but not limited to, peripheral component interface express (PCIe) connections, Bluetooth connections, universal serial bus (USB) connections, and any other method for transmission of information between the blockchain nodes 142A-D and between access nodes 146 and blockchain nodes 142A-D. In certain embodiments, in access nodes 146, the network interface 164 may also facilitate integration between the API 152 and other computation resources of an organization (e.g., accounting management applications). In certain embodiments, the access nodes 146 and blockchain nodes 142A-D may also include user interfaces 114 of the computer system 158. In certain embodiments, the user interfaces 114 may be displayed via user devices 118.

As described in greater detail herein, in certain embodiments, the one or more memories 162 store instructions that, when executed by the one or more processors 160, cause the one or more processors 160 to perform operations that include, among other things, receiving data relating to a bartering offer of a first set of one or more services or goods in exchange for a second set of one or more services or goods from a first user device 118 associated with a first user, and storing the data relating to the bartering offer in a distributed ledger 102. In addition, in certain embodiments, the one or more memories 162 store instructions that, when executed by the one or more processors 160, cause the one or more processors 160 to perform operations that include, among other things, receiving data relating to a bartering counteroffer to the bartering offer from a second user device 118 associated with a second user, wherein the bartering counteroffer comprises at least one change to the first set of one or more services or goods or the second set of one or more services or goods, and storing the data relating to the bartering counteroffer in the distributed ledger 102. In addition, in certain embodiments, the one or more memories 162 store instructions that, when executed by the one or more processors 160, cause the one or more processors 160 to perform operations that include, among other things, receiving confirmation of completion of an exchange of the first set of one or more services or goods for the second set of one or more services or goods, and storing data relating to the completion of the exchange in the distributed ledger 102. For example, in certain embodiments, a first user that has committed to performing a particular service for a second user may send a message to a user device 118 associated with the second user (e.g., via the one or more server devices 112) that the first user believes that the service has been performed. In addition, in certain embodiments, the first user may send a photo that indicates completion of a service (e.g., a mowed lawn, a washed car, and so forth) to the user device 118 associated with the second user (e.g., via the one or more server devices 112). In response, the first user may verify that the service has, in fact, been completed and send confirmation to the one or more server devices 112 that the service has been completed. Once all services have been performed and all goods are prepared to be traded, completion of the exchange may be confirmed (e.g., via communication with the one or more server devices 112) by the first and/or second users.

In certain embodiments, the bartering offer or the bartering counteroffer comprise a monetary value exchange that, for example, may be used to make a particular exchange of goods and/or services more fair, as agreed upon by the first and second users. In addition, in certain embodiments, the first set of one or more services or goods are assigned a first monetary value and the second set of one or more services or goods are assigned a second monetary value, and the monetary value exchange is determined based on the first and second monetary values (e.g., based on a difference between the first and second monetary values). In addition, in certain embodiments, the one or more memories 162 store instructions that, when executed by the one or more processors 160, cause the one or more processors 160 to perform operations that include, among other things, using one or more matching algorithms (e.g., stored in the one or more memories 162) to match the first user with the second user to establish a bartering process between the first user and the second user. For example, in certain embodiments, the one or more matching algorithms may identify that the first user has particular needs that may be capable of being met by the second user, even if neither user has indicated that the particular needs are wanted or available, respectively. In certain embodiments, the matching algorithms may be automatically (e.g., without human intervention) iteratively derived based on the data (e.g., the user data 104, the service data 106, the goods data 108, the exchange data 110, and so forth) stored in the distributed ledger 102 using artificial intelligence algorithms, such as neural networks, that are executed by the one or more processors 160. For example, in certain embodiments, the artificial intelligence algorithms may be configured to identify that certain users have performed certain services in the past and/or that those users are located geographically close to other users that may benefit from those certain services and, in response, may cause the one or more server devices 112 to recommend an exchange including such services between certain users.

In addition, in certain embodiments, the one or more memories 162 store instructions that, when executed by the one or more processors 160, cause the one or more processors 160 to perform operations that include, among other things, automatically (e.g., without human intervention) sending a message to the first user via the first user device 118 or the second user via the second user device 118 when the other user makes a bartering offer or bartering counteroffer, when the other user completes a performed service, and so forth. Indeed, in certain embodiments, the one or more memories 162 store instructions that, when executed by the one or more processors 160, cause the one or more processors 160 to perform operations that include, among other things, automatically (e.g., without human intervention) sending a control signal to the first user device 118 or the second user device 118 to launch (e.g., without human intervention) an application that includes a user interface 114 to notify (e.g., display a message) the respective first user or second user that the other user has made a bartering offer or bartering counteroffer, has completed a performed service, and so forth. Indeed, in certain embodiments, the one or more memories 162 store instructions that, when executed by the one or more processors 160, cause the one or more processors 160 to perform operations that include, among other things, automatically (e.g., without human intervention) sending a control signal to the first user device 118 or the second user device 118 to launch (e.g., without human intervention) the application via specific communication channels to minimize the impact that the communication between the server devices 112 and the user devices 118 has on other applications running on the user devices 118, for example.

Figure 7:
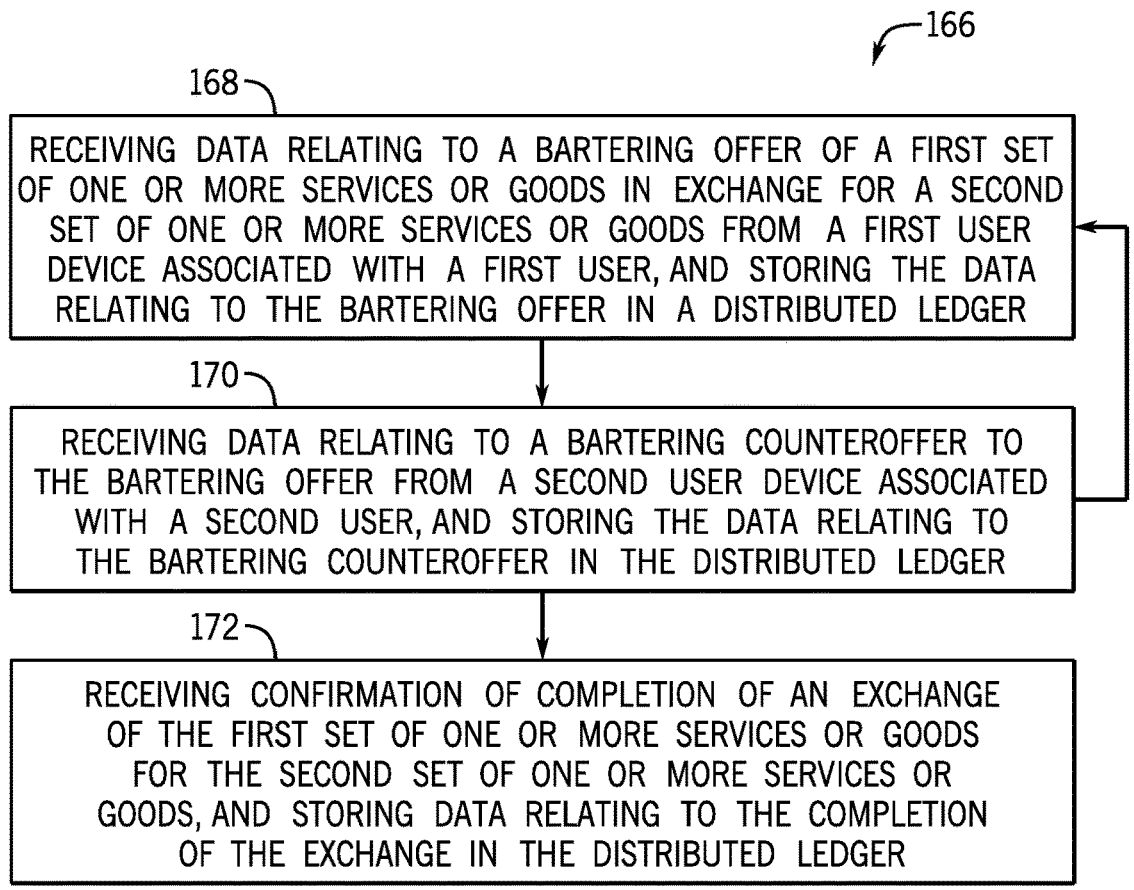
FIG. 7 illustrates a flow diagram of a method of operation of the system of FIG. 1, in accordance with embodiments described herein.

FIG. 7 illustrates a flow diagram of a method 166 of operation of the system 100 of FIG. 1, which may be performed at least in part by one or more server devices 112, in accordance with embodiments described herein. In certain embodiments, the method 166 includes receiving data relating to a bartering offer of a first set of one or more services or goods in exchange for a second set of one or more services or goods from a first user device 118 associated with a first user, and storing the data relating to the bartering offer in a distributed ledger 102 (block 168). In addition, in certain embodiments, the method 166 includes receiving data relating to a bartering counteroffer to the bartering offer from a second user device 118 associated with a second user, wherein the bartering counteroffer comprises at least one change to the first set of one or more services or goods or the second set of one or more services or goods, and storing the data relating to the bartering counteroffer in the distributed ledger 102 (block 170). In addition, in certain embodiments, the method 166 includes receiving confirmation of completion of an exchange of the first set of one or more services or goods for the second set of one or more services or goods, and storing data relating to the completion of the exchange in the distributed ledger 102 (block 172). As illustrated, in certain embodiments, the method 166 may continue between blocks 168 and 170 with the first and second users making bartering counteroffers until the exchange is approved by both users or declined by at least one of the users.

While only certain features of the disclosure have been illustrated and described herein, many modifications and changes will occur to those skilled in the art. For example, while the embodiments described herein include a specific logic organization for data structures and libraries, such as smart contracts and APIs, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

The invention claimed is:

1. A system comprising:
   at least one processor; and
   at least one non-transitory computer-readable storage media communicatively coupled to the at least one processor, the at least one non-transitory computer-readable storage media storing instructions which, when executed by the at least one processor, cause the at least one processor to perform operations comprising:
      implementing, via a network interface associated with the at least one processor, an application programming interface (API) configured to facilitate interaction with data relating to bartering of services or goods, wherein the data relating to bartering of services or goods is stored in a blockchain network;
      receiving, via the API, data relating to a bartering offer of a first set of one or more services or goods in exchange for a second set of one or more services or goods from a first user device associated with a first user, wherein the first set of one or more services or goods comprises one or more first set of personal tasks to be performed by the first user for a second user or a first set of personal property owned by the first user to be given to the second user, and the second set of one or more services or goods comprises one or more second set of personal tasks to be performed by the second user for the first user or a second set of personal property owned by the second user to be given to the first user;
      converting, via the API, the data relating to the bartering offer into binary code suitable for storage in the blockchain network;
      storing, via the API, the converted data relating to the bartering offer in the blockchain network; and
      sending, via the API, a first control signal to a second user device associated with the second user to automatically launch a first application via the second user device to notify the second user of the bartering offer.

2. The system of claim 1, wherein the operations comprise:
   receiving, via the API, data relating to a bartering counteroffer to the bartering offer from the second user device associated with the second user, wherein the bartering counteroffer comprises at least one change to the first set of one or more services or goods or the second set of one or more services or goods;
   storing, via the API, the data relating to the bartering counteroffer in the blockchain network; and
   sending, via the API, a second control signal to the first user device associated with the first user to automatically launch a second application via the first user device to notify the first user of the bartering counteroffer.

3. The system of claim 2, wherein the operations comprise:
   receiving, via the API, confirmation of completion of an exchange of the first set of one or more services or goods for the second set of one or more services or goods; and
   storing, via the API, data relating to the completion of the exchange in the blockchain network.

4. The system of claim 2, wherein the bartering offer or the bartering counteroffer comprise a monetary value exchange.

5. The system of claim 4, wherein the first set of one or more services or goods are assigned a first monetary value and the second set of one or more services or goods are assigned a second monetary value, and the monetary value exchange is determined based on the first and second monetary values.

6. The system of claim 2, wherein the operations comprise using one or more matching algorithms to match the first user with the second user to establish a bartering process between the first user and the second user.

7. The system of claim 6, wherein the one or more matching algorithms are automatically derived using artificial intelligence algorithms.

8. A method performed by at least one processor, the method comprising:
   implementing, via a network interface associated with the at least one processor, an application programming interface (API) configured to facilitate interaction with data relating to bartering of services or goods, wherein the data relating to bartering of services or goods is stored in a blockchain network;
   receiving, via the API, data relating to a bartering offer of a first set of one or more services or goods in exchange for a second set of one or more services or goods from a first user device associated with a first user, wherein the first set of one or more services or goods comprises one or more first set of personal tasks to be performed by the first user for a second user or a first set of personal property owned by the first user to be given to the second user, and the second set of one or more services or goods comprises one or more second set of personal tasks to be performed by the second user for the first user or a second set of personal property owned by the second user to be given to the first user;
   converting, via the API, the data relating to the bartering offer into binary code suitable for storage in the blockchain network;

storing, via the API, the converted data relating to the bartering offer in the blockchain network; and sending, via the API, a first control signal to a second user device associated with the second user to automatically launch a first application via the second user device to notify the second user of the bartering offer.

9. The method of claim 8, comprising:

receiving, via the API, data relating to a bartering counteroffer to the bartering offer from the second user device associated with the second user, wherein the bartering counteroffer comprises at least one change to the first set of one or more services or goods or the second set of one or more services or goods;

storing, via the API, the data relating to the bartering counteroffer in the blockchain network; and sending, via the API, a second control signal to the first user device associated with the first user to automatically launch a second application via the first user device to notify the first user of the bartering counteroffer.

10. The method of claim 9, comprising:

receiving, via the API, confirmation of completion of an exchange of the first set of one or more services or goods for the second set of one or more services or goods; and storing, via the API, data relating to the completion of the exchange in the blockchain network.

11. The method of claim 9, wherein the bartering offer or the bartering counteroffer comprise a monetary value exchange.

12. The method of claim 11, wherein the first set of one or more services or goods are assigned a first monetary value and the second set of one or more services or goods are assigned a second monetary value, and the monetary value exchange is determined based on the first and second monetary values.

13. The method of claim 9, comprising using one or more matching algorithms to match the first user with the second user to establish a bartering process between the first user and the second user.

14. The method of claim 13, wherein the one or more matching algorithms are automatically derived using artificial intelligence algorithms.

15. One or more non-transitory computer-readable storage media storing instructions which, when executed by at least one processor, cause the at least one processor to perform operations comprising:

implementing, via a network interface associated with the at least one processor, an application programming interface (API) configured to facilitate interaction with data relating to bartering of services or goods, wherein the data relating to bartering of services or goods is stored in a blockchain network;

receiving, via the API, data relating to a bartering offer of a first set of one or more services or goods in exchange for a second set of one or more services or goods from a first user device associated with a first user, wherein the first set of one or more services or goods comprises one or more first set of personal tasks to be performed by the first user for a second user or a first set of personal property owned by the first user to be given to the second user, and the second set of one or more services or goods comprises one or more second set of personal tasks to be performed by the second user for the first user or a second set of personal property owned by the second user to be given to the first user;

converting, via the API, the data relating to the bartering offer into binary code suitable for storage in the blockchain network;

storing, via the API, the converted data relating to the bartering offer in the blockchain network; and sending, via the API, a first control signal to a second user device associated with the second user to automatically launch a first application via the second user device to notify the second user of the bartering offer.

16. The one or more non-transitory computer-readable storage media of claim 15, wherein the operations comprise:

receiving, via the API, data relating to a bartering counteroffer to the bartering offer from the second user device associated with the second user, wherein the bartering counteroffer comprises at least one change to the first set of one or more services or goods or the second set of one or more services or goods;

storing, via the API, the data relating to the bartering counteroffer in the blockchain network; and sending, via the API, a second control signal to the first user device associated with the first user to automatically launch a second application via the first user device to notify the first user of the bartering counteroffer.

17. The one or more non-transitory computer-readable storage media of claim 16, wherein the operations comprise:

receiving, via the API, confirmation of completion of an exchange of the first set of one or more services or goods for the second set of one or more services or goods; and storing, via the API, data relating to the completion of the exchange in the blockchain network.

18. The one or more non-transitory computer-readable storage media of claim 16, wherein the bartering offer or the bartering counteroffer comprise a monetary value exchange.

19. The one or more non-transitory computer-readable storage media of claim 18, wherein the first set of one or more services or goods are assigned a first monetary value and the second set of one or more services or goods are assigned a second monetary value, and the monetary value exchange is determined based on the first and second monetary values.

20. The one or more non-transitory computer-readable storage media of claim 16, wherein the operations comprise using one or more matching algorithms to match the first user with the second user to establish a bartering process between the first user and the second user.

21. The one or more non-transitory computer-readable storage media of claim 20, wherein the one or more matching algorithms are automatically derived using artificial intelligence algorithms.

* * * * *